(12) United States Patent
Ghioni et al.

(10) Patent No.: US 8,412,042 B2
(45) Date of Patent: Apr. 2, 2013

(54) INNOVATIVE ARCHITECTURE FOR FULLY NON BLOCKING SERVICE AGGREGATION WITHOUT O-E-O CONVERSION IN A DWDM MULTIRING INTERCONNECTION NODE

(75) Inventors: Lorenzo Ghioni, Casalmaiocco (IT); Ronald Johnson, San Ramon, CA (US); Maurizio Gazzola, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 12/764,641

(22) Filed: Apr. 21, 2010

(65) Prior Publication Data

US 2011/0262141 A1    Oct. 27, 2011

(51) Int. Cl.
*H04B 10/00* (2006.01)
(52) U.S. Cl. ................... 398/70; 398/3; 398/59
(58) Field of Classification Search ........ 398/3, 59, 398/70
See application file for complete search history.

(56) References Cited

U.S. PATENT DOCUMENTS

| | | | | |
|---|---|---|---|---|
| 4,731,784 A * | 3/1988 | Keller et al. | | 398/99 |
| 5,550,818 A * | 8/1996 | Brackett et al. | | 370/395.51 |
| 6,208,443 B1 * | 3/2001 | Liu et al. | | 398/9 |
| 6,226,111 B1 * | 5/2001 | Chang et al. | | 398/9 |
| 6,339,488 B1 * | 1/2002 | Beshai et al. | | 398/59 |
| 6,449,069 B1 * | 9/2002 | Fujita | | 398/43 |
| 6,512,614 B1 * | 1/2003 | Saleh et al. | | 398/47 |
| 6,616,349 B1 * | 9/2003 | Li et al. | | 398/4 |
| 6,661,800 B1 * | 12/2003 | Hayama et al. | | 370/403 |
| 6,707,823 B1 * | 3/2004 | Miyao | | 370/406 |
| 6,839,514 B1 * | 1/2005 | Sharma et al. | | 398/2 |
| 6,895,182 B1 * | 5/2005 | Moriyama et al. | | 398/3 |
| 6,978,059 B2 * | 12/2005 | Martin et al. | | 385/16 |
| 7,054,264 B2 * | 5/2006 | Mor | | 370/223 |
| 7,254,336 B2 * | 8/2007 | Harney et al. | | 398/83 |
| 7,280,758 B2 * | 10/2007 | Doh et al. | | 398/59 |
| 7,460,744 B2 * | 12/2008 | Nakagawa | | 385/24 |
| 7,545,735 B1 * | 6/2009 | Shabtay et al. | | 370/217 |
| 7,602,706 B1 * | 10/2009 | Gardo et al. | | 370/219 |
| 7,623,445 B1 * | 11/2009 | Daniel et al. | | 370/222 |

(Continued)

OTHER PUBLICATIONS

International Search Report and Written Opinion for PCT Patent Application No. PCT/US2011/033311, mailed on Jul. 7, 2011, 16 pages.

(Continued)

*Primary Examiner* — Agustin Bello

(57) ABSTRACT

According to one general aspect, an interconnection node may be configured to dynamically provide interconnection access between a first optical network (e.g., a core optical network) and at least either a second optical network (e.g., an access optical network) or a third optical network (e.g., another access optical network) in a purely optical fashion. The interconnection node may include a first network portion and a second and third network portions. The first network portion may be coupled with the first network that includes a first pair of wavelength cross-connect (WXC) units coupled between a first transmission path of the first network, and providing a plurality of add and drop ports, and a second pair of wavelength cross-connect (WXC) units coupled between a second transmission path of the first network, and providing a plurality of add and drop ports. The second network portion may be coupled with the second network and the first network portion of the interconnection node such that optical signals may be routed between the second network and the first network. The third network portion may be coupled with the third network and the first network portion of the interconnection node such that optical signals may be routed between the third network and the first network.

20 Claims, 11 Drawing Sheets

U.S. PATENT DOCUMENTS

| | | | |
|---|---|---|---|
| 7,711,270 B2* | 5/2010 | Ooi et al. | 398/175 |
| 7,853,148 B2* | 12/2010 | Akiyama et al. | 398/83 |
| 7,856,182 B2* | 12/2010 | Boden | 398/3 |
| 8,041,213 B2* | 10/2011 | Nakano | 398/50 |
| 8,131,152 B2* | 3/2012 | Akiyama et al. | 398/83 |
| 2002/0048066 A1* | 4/2002 | Antoniades et al. | 359/128 |
| 2002/0145782 A1* | 10/2002 | Strasser et al. | 359/127 |
| 2002/0191250 A1* | 12/2002 | Graves et al. | 359/128 |
| 2003/0020994 A1* | 1/2003 | Boden | 359/173 |
| 2003/0025956 A1* | 2/2003 | Li et al. | 359/110 |
| 2003/0048501 A1* | 3/2003 | Guess et al. | 359/118 |
| 2004/0165891 A1* | 8/2004 | Kopelovitz et al. | 398/83 |
| 2005/0135804 A1* | 6/2005 | Rashid et al. | 398/4 |
| 2005/0196169 A1* | 9/2005 | Tian et al. | 398/59 |
| 2006/0045532 A1* | 3/2006 | Yano | 398/147 |
| 2008/0080861 A1* | 4/2008 | Chung et al. | 398/56 |
| 2008/0279552 A1 | 11/2008 | Ou et al. | |
| 2009/0034978 A1* | 2/2009 | Gazzola et al. | 398/83 |
| 2009/0142057 A1* | 6/2009 | Nakano | 398/50 |
| 2009/0148166 A1* | 6/2009 | Akiyama et al. | 398/83 |
| 2010/0067899 A1* | 3/2010 | Li et al. | 398/1 |
| 2011/0229136 A1* | 9/2011 | Wellbrock et al. | 398/58 |
| 2011/0262141 A1* | 10/2011 | Ghioni et al. | 398/83 |
| 2012/0099866 A1* | 4/2012 | Frigo et al. | 398/79 |

OTHER PUBLICATIONS

"40-Channel Reconfigurable Optical Add/Drop Multiplexing Portfolio for", http://www.cisco.com/en/US/prod/collateral/optical/ps5724/ps2006/prod . . . , (Sep. 20, 2009), 9 pages.

"Reconfigurable optical add-drop multiplexer", http://en.wikipedia.org/wiki/ROADM, (Nov. 1, 2009), 1 page.

"Fiber-optic communication", http://en.wikipedia.org/wiki/Fiber-optic_communication, (Nov. 1, 2009), 10 pages.

* cited by examiner

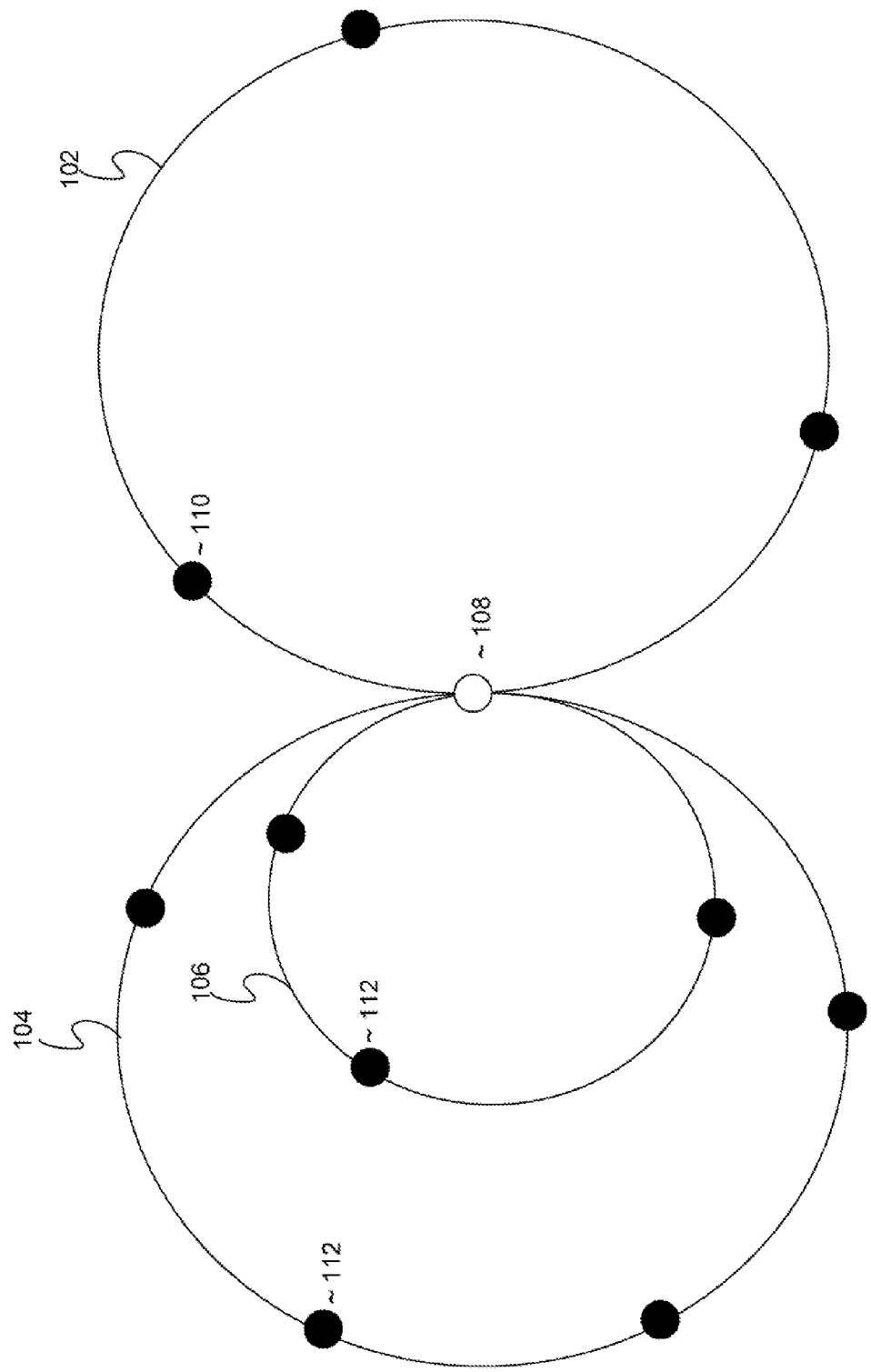

200a

200c

300a

300d

INNOVATIVE ARCHITECTURE FOR FULLY NON BLOCKING SERVICE AGGREGATION WITHOUT O-E-O CONVERSION IN A DWDM MULTIRING INTERCONNECTION NODE

TECHNICAL FIELD

This description relates generally to optical networks.

BACKGROUND

Fiber-optic communication is a method of transmitting information from one place to another by sending pulses of light through an optical fiber. The light forms an electromagnetic carrier wave that is modulated to carry information. Fiber-optic communication systems have revolutionized the telecommunications industry and have played a major role in the advent of the Information Age. Because of its advantages over electrical transmission, optical fibers have largely replaced copper wire communications in core networks in the developed world.

The process of communicating using fiber-optics may include, at least in some cases, the following basic steps: creating the optical signal involving the use of a transmitter, relaying the signal along the fiber, ensuring that the signal does not become too distorted or weak, receiving the optical signal, and converting it into an electrical signal.

A reconfigurable optical add-drop multiplexer (ROADM) is generally a form of optical add-drop multiplexer that adds the ability to remotely switch traffic from a wavelength-division multiplexing (WDM) system or a dense WDM (DWDM) system at the wavelength layer. This typically allows individual or multiple wavelengths carrying data channels to be added and/or dropped from a transport fiber without the need to convert the signals on all of the DWDM channels to electronic signals and back again to optical signals.

BRIEF DESCRIPTION OF THE DRAWINGS

FIG. 1 is a block diagram of an example embodiment of a system in accordance with the disclosed subject matter.

Like reference symbols in the various drawings indicate like elements.

DETAILED DESCRIPTION

Overview

Figure 2A:
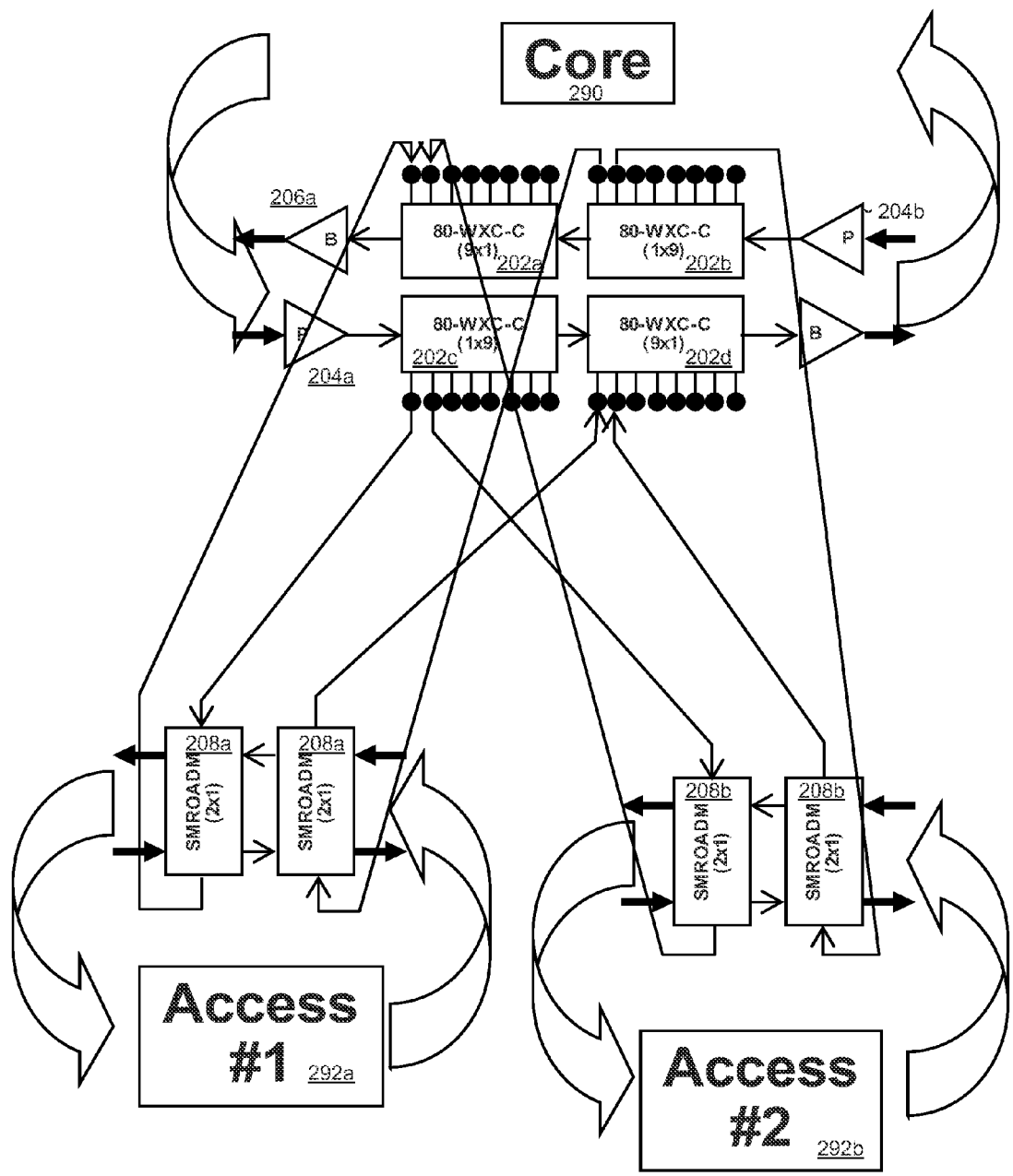
FIG. 2 is a series of block diagrams of example embodiments of systems in accordance with the disclosed subject matter.

According to one general aspect, an interconnection node may be configured to dynamically provide interconnection access between a first optical network (e.g., a core optical network) and at least either a second optical network (e.g., an access optical network) or a third optical network (e.g., another access optical network) in a purely optical fashion. The interconnection node may include a first network portion and a second and third network portions. The first network portion may be coupled with the first network that includes a first pair of wavelength cross-connect (WXC) units coupled between a first transmission path of the first network, and providing a plurality of add and drop ports, and a second pair of wavelength cross-connect (WXC) units coupled between a second transmission path of the first network, and providing a plurality of add and drop ports. The second network portion may be coupled with the second network and the first network portion of the interconnection node such that optical signals may be routed between the second network and the first network. The third network portion may be coupled with the third network and the first network portion of the interconnection node such that optical signals may be routed between the third network and the first network.

According to another general aspect, another interconnection node may be configured to dynamically provide interconnection access between a first optical network (e.g., a core optical network) and at least either a second optical network (e.g., an access optical network) or a third optical network (e.g., another access optical network) in a purely optical fashion. The interconnection node may include a first network portion coupled with the first network that includes an omni-directional and colorless multi-degree routing portion. The second network portion coupled with the second network and the first network portion of the interconnection node such that optical signals may be routed between the second network and the first network. The a third network portion coupled with the third network and the first network portion of the interconnection node such that optical signals may be routed between the third network and the first network.

According to another general aspect, a method may include routing, in a purely optical fashion, an optical signal through an interconnection node configured to dynamically provide interconnection access between a first optical network (e.g., a core optical network) and at least either a second optical network (e.g., an access optical network) or a third optical network (e.g., another access optical network). In various embodiments, routing the optical signal through the interconnection node may include receiving the optical signal via a first network portion of the interconnection node that is coupled with the first network and includes an omni-directional and colorless multi-degree routing portion. The method may also include outputting the optical signal to either the second or third optical network via either: a second network portion coupled with the second network and the first network portion of the interconnection node, or a third network portion coupled with the third network and the first network portion of the interconnection node.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

DESCRIPTION

FIG. 1 is a block diagram of an example embodiment of a system 100 in accordance with the disclosed subject matter. In one embodiment, the system 100 may include three optical ring networks 102, 104, and 106. In the illustrated embodiment, the optical ring network 102 may include a core optical network that provides networking capabilities to a number of access optical networks (e.g., access networks 104 and 106). These three networks 102, 104, and 106 may interconnect via interconnection node 108.

Often these three networks 102, 104, and 106 may wish to transmit information between them. Traditionally this may be done by converting an optical signal from one network (e.g., access network 104) to an electrical signal and then re-converting it to an optical signal on the receiving network (e.g., core network 102). This is referred to as optical-electrical-optical (OEO) conversion. However, this is inefficient. It may be desirable to transmit signals from one network to another in a cost effective purely optical fashion or way. In this context, according to an example embodiment, the phrase "purely optical fashion" may refer to the transmission of an optical signal from a first point or node to a second point or node without converting the optical signal into an electrical signal or subjecting the optical signal to an OEO conversion. Or, the phrase "purely optical fashion" may refer to processing that may occur (e.g., within one node, or across multiple nodes) on optical signals without converting the optical signals to an electrical signal.

Furthermore, each network 102, 104, and 106 may be configured to transmit optical signals of various wavelengths (e.g., DWDM networks). If the networks 102, 104, and 106 comprise nodes or components created by different vendors the supported wavelengths may not be compatible.

Each access network 104 and 106 may include a number of access 2-degree ROADMs or nodes 112 configured to add/remove optical signals from the access network or route the signal within the optical network (for networks that are more than the simplified illustrated ring networks). In the parlance of optical networking when an optical signal is removed from an optical transmission path (e.g., converted into an electrical signal or routed to another optical device), it is referred to as being "dropped" or "terminated". Whereas, when an optical signal added or made a tributary to a transmission path, this is referred to as "adding".

In one embodiment, a 2-degree ROADM 112 may be configured to either route an optical signal to one other node or to be dropped (converting an optical signal to an electrical signal). The numbers of degrees or directions associated with a ROADM 112 describe the number or ports or places an incoming optical signal may be routed to. Hence a 2-degree ROADM 112 allows a signal to either remain in the optical transmission path or to be dropped to another transmission path.

Traditionally, in colored ROADMs the ability to route or add/drop an optical signal was wavelength dependent (wherein each wavelength is colloquially referred to as a "color"). In the illustrated embodiment, the ROADMs 112 may include colorless ROADMs that are configured such that each port of the ROADM 112 may be used to terminate a single wavelength or single optical signal. In various embodiments, the ROADM 112 may be configured to add/drop optical signals in a colorless fashion. In this context the term "colorless fashion" includes routing the optical signal without limiting the routing options based upon the wavelength or color of the optical signal.

In one embodiment, a 2-degree ROADM 112 may become a Feeding Ring or access network termination point.

Conversely, an interconnect node 108 may include a multi-degree ROADM or an omni-directional ROADM configured to route optical signals from a variety of degrees or directions to a multitude of directions, including adding or dropping the optical signals. In such an embodiment, an optical signal may arrive at the interconnect node 108 from the access network 104 and be dynamically routed to either the core network 102, the other access network 106, or be dropped to an electrical signal and transmitted to an electrical network (not shown). Likewise, an electrical signal may be added via the interconnect node 108 and dynamically routed to any of the three optical networks 102, 104, and 106.

With 2-degree or multi-degree ROADMs the entry port matters in that each entry port may only transmit the incoming signal to one of N output ports or degrees (e.g., 2 ports in a 2-degree ROADM, 8 ports in an 8-degree node, etc.). In such a situation if a destination node of an optical signal is not coupled to one of the output ports of the optical signal's input port, the optical signal will not be able to directly transmit to that destination node. If the destination port is coupled to one of the output ports of the ROADM, but not one of that particular input port's output ports the optical signal will have to leave the ROADM and re-enter the ROADM via a different input port. Conversely, in an omni-directional ROADM any input port may be connected to any output port. Therefore, in a 40 channel or port omni-directional ROADM, an input port may reach any of the 40 outputs. Whereas, in a 40-channel or 40-ported 8-degree ROADM each input port may only reach 8 of the 40 output ports.

ROADMs are generally bi-directional in that a 2-degree ROADM that supplies one input optical port, two drop ports and one output optical port (also referred to as a 1x3 ROADM) may be configured to supply one input optical port, two add ports and one output optical port (also referred to as a 3x1 ROADM).

Likewise, an 8-degree ROADM that supplies one input port, eight drop ports, and one output optical port (a 1x9 ROADM) and be configured to supply one input port, eight add ports, and one output optical port (a 9x1 ROADM)

Several configurations of the interconnect ROADM 108 are possible to allow different degrees of flexibility. Several embodiments of these configurations are described in more detail below in FIGS. 2, 3, and 4. However, it may be useful to the reader's understanding to describe multi-degree or omni-directional ROADM nodes 108 in general before describing specific embodiments of the ROADM node 108.

Such multi-degree or omni-directional ROADM nodes 108 often include a patch-panel mesh (PP-Mesh) (e.g., an 8-sided PP-Mesh, etc.). Embodiments of such a PP-Mesh may be seen in FIGS. 3 and 4. In such a ROADM node an optical signal may enter the PP-Mesh from any of a number (e.g., 8) sides or directions and be dynamically routed to any of the other (e.g., 7) sides or directions. The multi-degree ROADM node 108 may also include a 2-degree ROADM or equivalent coupled before each side of the PP-Mesh. These 2-degree ROADMs may be configured to add or drop electrical signals and route incoming optical signals into the PP-Mesh for further routing.

In one embodiment, a ROADM node 108 may be configured such that each port may be used to terminate a single wavelength in a colorless fashion. In various embodiments, a multi-degree ROADM node 108 may include a series of cascaded wavelength cross-connect (WXC) units in order to support more than 8 add/drop ports per direction of the multi-degree ROADM node 108.

In various embodiments, a ROADM node 108 may be colorless such that the wavelength of an optical signal may be used as an additional flexibility point through the network 100. For example, a colorless ROADM 108 may dynamically select to add an electrical signal to the network 100 at a particular wavelength (e.g., green) if that wavelength would provide advantages when transmitting the resultant optical signal through the network (e.g., less congestion compared to a yellow wavelength).

Furthermore, a colorless ROADM 108 be configured to allow the termination of a DWDM multiplexing selection via the ROADM's 108 add/drop port. In such an embodiment, the ROADM 108 may be configured to change the color or wavelength of an optical signal. For example, a green optical signal may enter the ROADM 108; the ROADM 108 may drop the green optical signal to an OEO conversion unit that reconstitutes the information of the optical signal into an orange optical signal, which the ROADM 108 may then route as it desires.

A multi-degree colorless interconnect ROADM node 108 may be important to the efficiency and maintainability of an optical network 100. In such an embodiment, the colorlessness of the ROADM 108 at a DWDM level may save OEO conversion costs and further allow End-to-End (E2E) network provisioning and management across different segments of the network 100 (e.g., networks 102, 104, and 106).

Several configurations of the interconnect ROADM 108 are possible to allow different degrees of flexibility. Several embodiments of these configurations are described in more detail below. FIG. 2 illustrates and shows embodiments of an interconnect ROADM 108 that provide directional Access network 104 or 106 to Core network 102 (Access-Core) interconnection capabilities while providing no Access-to-Access interconnection capabilities. FIG. 3 illustrates and shows embodiments of an interconnect ROADM 108 that provide Omni-Directional interconnection capabilities while providing no Access-to-Access interconnection capabilities. FIG. 4 illustrates and shows embodiments of an interconnect ROADM 108 that provide Omni-Directional interconnection capabilities and Access-to-Access interconnection capabilities.

Figure 2B:
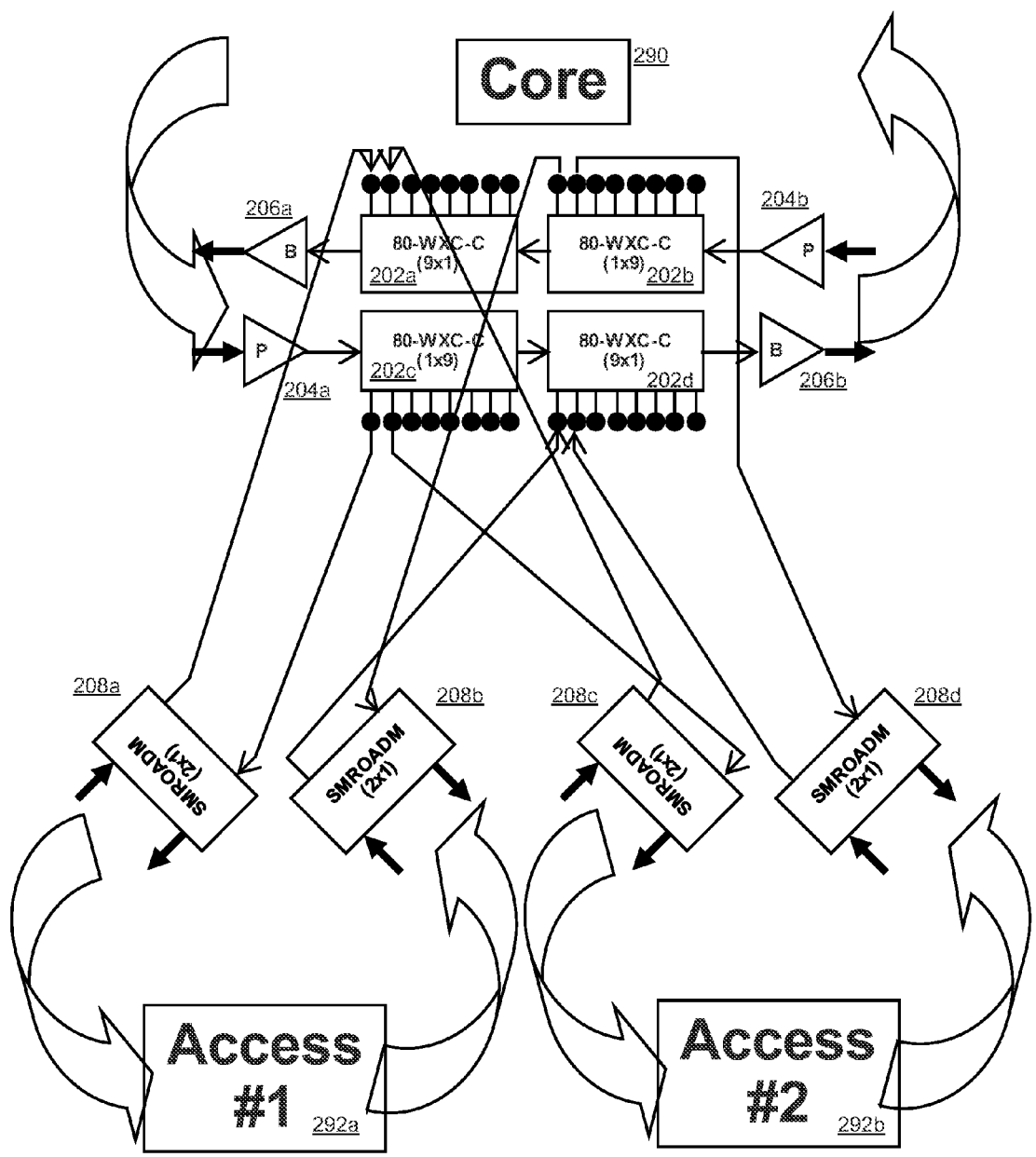
Figure 2C:
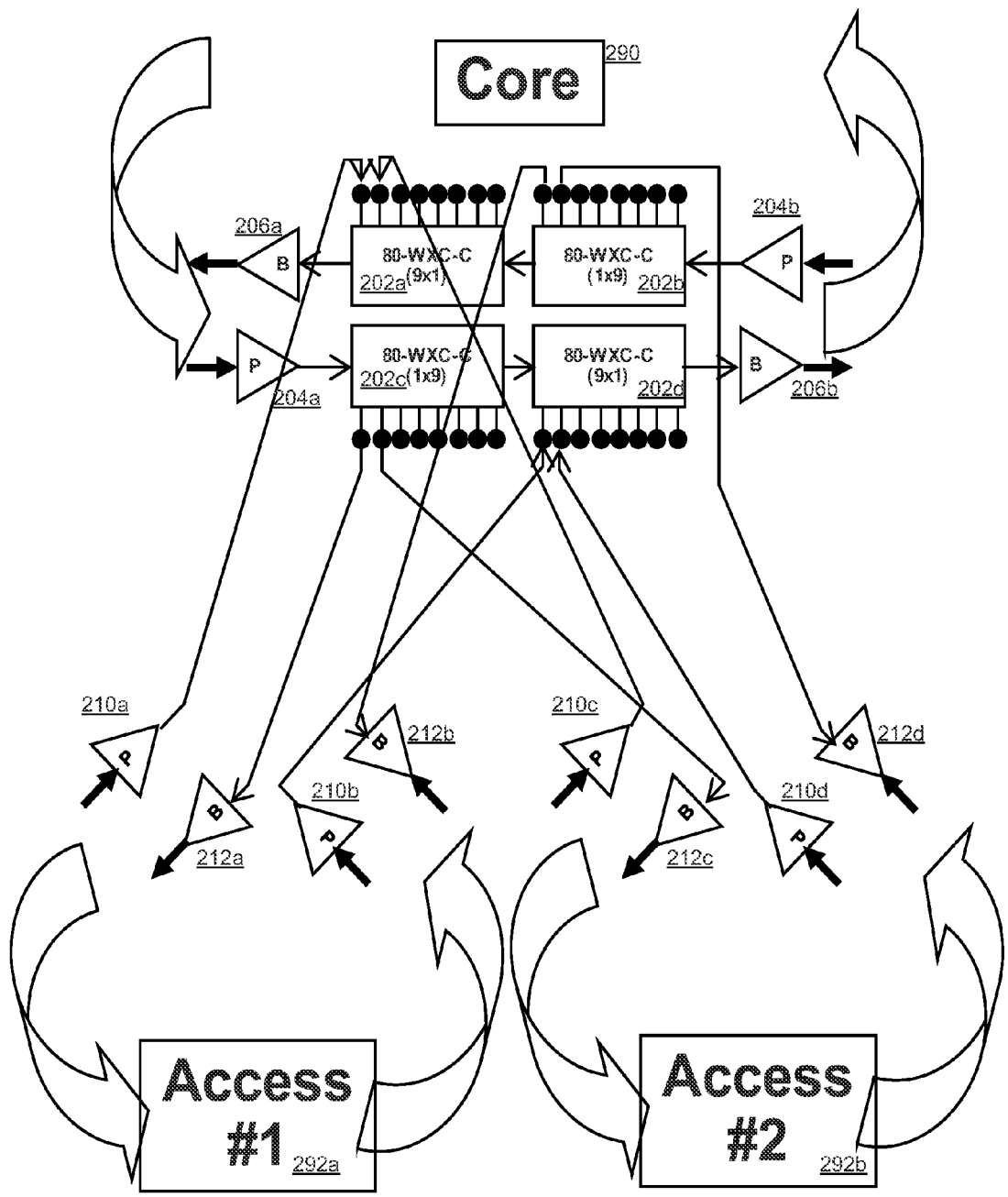

FIG. 2 is a series of block diagrams of example embodiments of systems in accordance with the disclosed subject matter. Furthermore, it is understood that FIGS. 2a, 2b, and 2c represent a plurality of embodiments grouped together for purposes of illustration and description, herein the multiple pages will simply be referred to as FIG. 2. Specifically, FIG. 2 illustrates and shows embodiments of an interconnect ROADM 108 that provide directional Access-Core interconnection capabilities while providing no Access-to-Access interconnection capabilities.

FIG. 2a illustrates a first embodiment of a system or interconnection node 200a that is configured to provide directional Access-Core interconnection capabilities while providing no Access-to-Access interconnection capabilities. The interconnection node 200a may be coupled with a core optical network 290, and a first access optical network 292a, and a second optical network 292b.

In one embodiment, the node 200a may include core network portion including a four wavelength cross-connect (WXC) units 202a, 202b, 202c, and 202d (collectively WXCs 202). These WXC units 202 may be coupled to provide a plurality (e.g., 9) incoming ports, and a plurality (e.g., 9) of outgoing ports per direction of the core network 290. For example, the WXCs 202a and 202b may be paired and coupled in series to provide a first transmission path through the core network 290 and 8 add/drop ports to other transmission paths (coupled to the access networks 292a and 292b, as described below). WXC 202b may supply or support 8 drop ports. While WXC 202a may supply or support 8 add ports. Likewise, the WXCs 202c and 202d may be paired and coupled in series to provide a second or bi-directional transmission path through the core network 290 and 8 add/drop ports to other transmission paths.

In addition the core network portion of node 200a may include pre-in amplifiers 204a and 204b (collectively 204) and booster amplifiers 206a and 206b (collectively 206) configured to increase optical signal strength or power level when an optical signal is received or transmitted to/from the core network 290.

Access network 292a may be coupled with two 2-degree ROADMs 208a and 208b that each provide a transmission path through the respective 2-degree ROADM 208 and one add/drop port to other transmission paths. In such an embodiment, the two 2-degree ROADMs 208a and 208b may be coupled in series or back-to-back in order to provide a bi-directional transmission path through the access network 292a and one add/drop port to other transmission paths that are coupled to the core network WXC units 202. More explicitly, the drop port of ROADM 208a may be coupled with an add port of WXC 202a. The add port of ROADM 208a may be coupled with a drop port of WXC 202c. Likewise, the drop port of ROADM 208b may be coupled with an add port of WXC 202d, and the add port of ROADM 208b may be coupled with a drop port of WXC 202c.

Access network 292b may be coupled with two 2-degree ROADMs 208c and 208d that mirror the configuration of the ROADMs 208a and 208b for access network 292a. ROADMs 208a, 208b, and 208c, and 208d (collectively 208) may be referred to as the access network portions of the node 200a. Wherein ROADMs 208a and 208b comprise the first access network portion of node 200a, and the ROADMs 208c and 208d comprise the second access network portion of node 200a.

In such an embodiment, interconnection between the core network 292 and either of the access networks 292a and 292b may be supported at an individual wavelength granularity. In various embodiments, the WXC units 202 and ROADMs 208 may be colorless.

Also, the form of interconnection between core network 292 and either of the access networks 292a and 292b may be directional in that if an optical signal enters the system 200a, from access network 292a, via ROADM 208a it will exit the system 200a, to the core network 290, via WXC 202d and booster amplifier 206b. However, if an optical signal enters the system 200a, from access network 292a, via ROADM 208b it will exit the system 200a, to the core network 290, via WXC 202a and booster amplifier 206a.

In one embodiment, no direct cross-access network 292a and 292b traffic may be allowed. In such an embodiment, the access networks 292a and 292b may be physically separated and partitioned from one another. However, core-access network traffic may be possible. Also, an internal access network traffic or transmission path may be possible as the ROADMs 208 are placed back-to-back or in series.

In various embodiments, the WXC units 202 may include an 80 channel WXC, as shown, or another channel configuration (e.g., 40 channels, etc.). In such an embodiment, the WXC units' 202 ports may be used for more traditional add/drop purposes (e.g., to a node or electrical device, etc.) or for interconnection capabilities (e.g., between networks 290, 292a, and 292b). In various embodiments, the interconnect node 200a may provide up to 18 degrees that may be terminated in the node 200a.

FIG. 2b illustrates a second embodiment of a system or interconnection node 200b that is configured to provide directional Access-Core interconnection capabilities while providing no Access-to-Access interconnection capabilities. The interconnection node 200b may be coupled with a core optical network 290, and a first access optical network 292a, and a second optical network 292b.

In such an embodiment, the core network portion (WXC units 204 and amplifiers 204 and 206) may be configured similarly to that of node 200*a*. However, the access portions (ROADMs 208) may be configured differently.

In the illustrated embodiment, the ROADMs 208 may not be configured in series or back-to-back as illustrated for node 200*a*. In this embodiment, node 200*b* may include a first ROADM (ROADMs 208*a* and 208*c*) coupled with its transmission path ports coupled to a first interface of the access network (access networks 292*a* and 292*b*, respectively) and its drop port coupled with an add port of the WXC 202*a*, and its add port coupled with a drop port of the WXC 202*c*. Likewise, the second ROADM (ROADMs 208*b* and 208*d*) of the access network's ROADM pair coupled with its transmission path ports coupled to a second interface of the access network (access networks 292*a* and 292*b*, respectively) and its drop port coupled with an add port of the WXC 202*b*, and its add port coupled with a drop port of the WXC 202*d*.

In such an embodiment, interconnection between the core network 292 and either of the access networks 292*a* and 292*b* may be supported at an individual wavelength granularity. In various embodiments, the WXC units 202 and ROADMs 208 may be colorless. Again, the form of interconnection between core network 292 and either of the access networks 292*a* and 292*b* may be directional. In various embodiments, the interconnect node 200*a* may provide up to 18 degrees that may be terminated in the node 200*a*.

No direct cross-access network 292*a* and 292*b* traffic may be allowed. In such an embodiment, the access networks 292*a* and 292*b* may be physically separated and partitioned from one another. However, core-access network traffic may be possible. In this embodiment, an internal access network traffic or transmission path may not be possible as the ROADMs are not placed in series, but instead cause the access networks transmission path to loop-back upon itself at the ends of the access networks 292*a* and 292*b*.

FIG. 2*c* illustrates a third embodiment of a system or interconnection node 200*c* that is configured to provide directional Access-Core interconnection capabilities while providing no Access-to-Access interconnection capabilities. The interconnection node 200*c* may be coupled with a core optical network 290, and a first access optical network 292*a*, and a second optical network 292*b*.

In such an embodiment, the core network portion (WXC units 204 and amplifiers 204 and 206) may be configured similarly to that of node 200*a*. However, the access portions (ROADMs 208 in nodes 200*a* and 200*b*) may be configured differently.

In the illustrated embodiment, the access network portions of node 200*c* do not include ROADMs, but instead include pre-in amplifiers 210*a*, 210*b*, 210*c*, and 210*d* (collectively 210) and booster amplifiers 212*a*, 212*b*, 212*c*, and 212*d* (collectively 212). In one embodiment, a first transmission path of the access network 292*a* may output to the pre-in amplifier 210*a* and receive input from the booster amplifier 212*b*, and a second transmission path of the access network 292*a* may output to the pre-in amplifier 210*b* and receive input from the booster amplifier 212*a*. Likewise, with access network 292*b* and pre-in amplifiers 210*c* and 210*d* and booster amplifier 212*c* and 212*d*.

In such an embodiment, the pre-in amplifier 210*a* may be coupled with an add port of the WXC 202*a* and the booster amplifier 212*b* may be coupled with a drop port of the WXC 202*b*. The pre-in amplifier 210*b* may be coupled with an add port of the WXC 202*d* and the booster amplifier 212*a* may be coupled with a drop port of the WXC 202*c*. Similarly, with the second access network portion coupled to access network 292*b*.

In such an embodiment, interconnection between the core network 292 and either of the access networks 292*a* and 292*b* may be supported at an individual wavelength granularity. In various embodiments, the WXC units 202 and ROADMs 208 may be colorless. Again, the form of interconnection between core network 292 and either of the access networks 292*a* and 292*b* may be directional. In various embodiments, the interconnect node 200*a* may provide up to 18 degrees that may be terminated in the node 200*c*.

No direct cross-access network 292*a* and 292*b* traffic may be allowed. In such an embodiment, the access networks 292*a* and 292*b* may be physically separated and partitioned from one another. However, core-access network traffic may be possible. In this embodiment, an internal access network traffic or transmission path may not be possible.

FIG. 3 is a series of block diagrams of example embodiments of systems or interconnect nodes in accordance with the disclosed subject matter. Furthermore, it is understood that FIGS. 3*a*, 3*b*, 3*c*, and 3*d* represent a plurality of embodiments grouped together for purposes of illustration and description; herein the multiple pages will simply be referred to as FIG. 3. Specifically, FIG. 3 illustrates and shows embodiments of an interconnect ROADM or node that provides omni-directional Access-Core interconnection capabilities while providing no Access-to-Access interconnection capabilities.

Figure 3A:
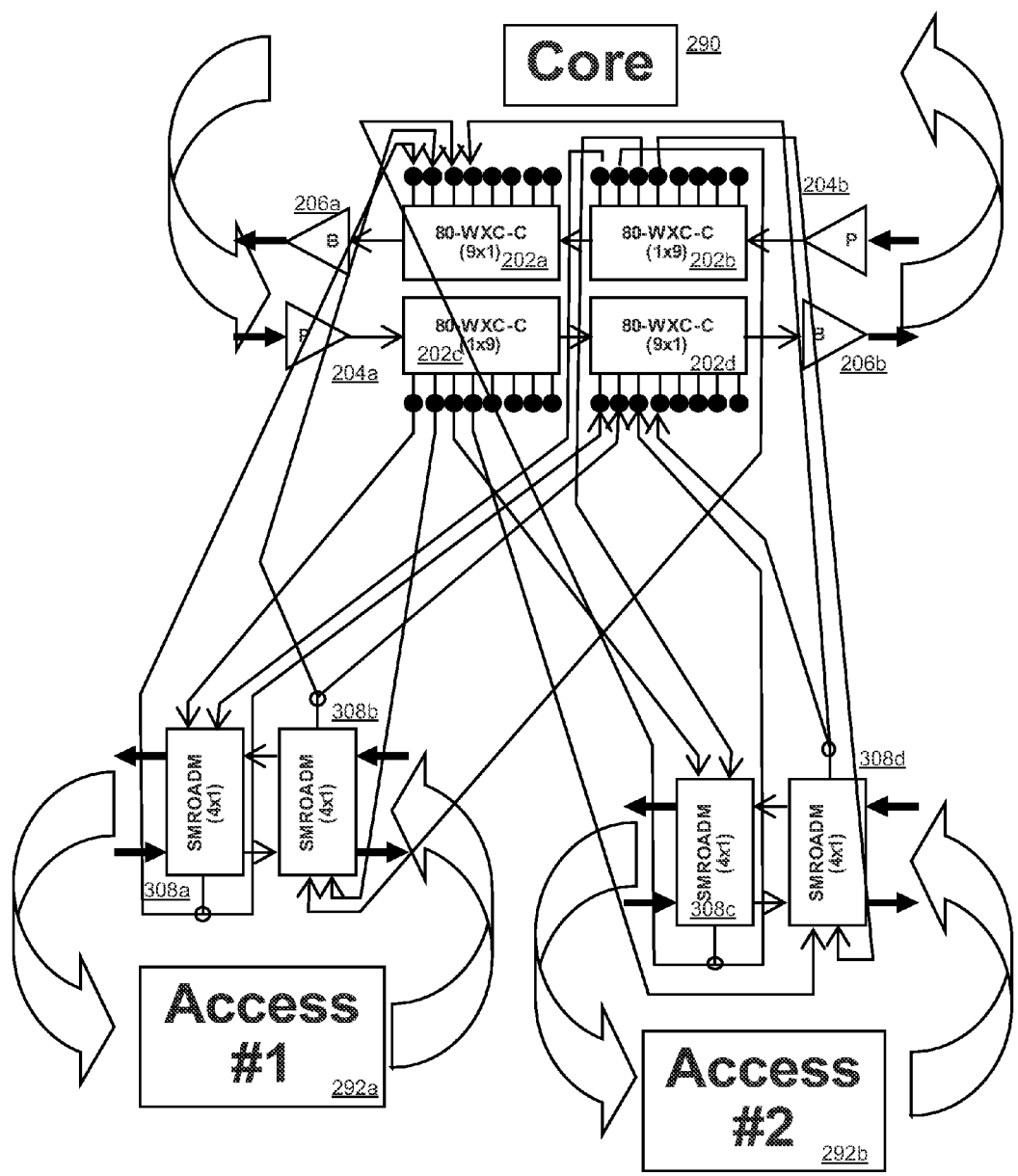
FIG. 3 is a series of block diagrams of example embodiments of systems in accordance with the disclosed subject matter.

FIG. 3*a* illustrates a first embodiment of a system or interconnection node 300*a* that is configured to provide omni-directional Access-Core interconnection capabilities while providing no Access-to-Access interconnection capabilities. The interconnection node 300*a* may be coupled with a core optical network 290, and a first access optical network 292*a*, and a second optical network 292*b*.

In such an embodiment, the core network portion (WXC units 204 and amplifiers 204 and 206) may be configured similarly to that of node 200*a*. However, the access portions (ROADMs 308*a*, 308*b*, 308*c*, and 308*d*, collectively ROADMs 308) may be configured differently.

In the illustrated embodiment, the ROADMs 308 may include 4-degree ROADMs with three add ports and three drop ports. One of each of the add/drop ports may be used in placing the ROADMs 308 is series or back-to-back. As with node 200*a* the ROADMs 308*a* and 308*b* may be connected in series or back-to-back. In addition ROADMs 308 may have both of their two remaining drop ports coupled with each of the WXC pairs (WXC 204*a*/204*b* and 204*c*/204*d*) of the core portion of the node 300*a*. For example, all four remaining drop ports of ROADMs 308*a* and 308*b* (two drop ports each) may be coupled with the add ports of WXC 204*a* and WXC 204*d*.

Likewise, ROADMs 308 may have both of their add ports coupled with each of the WXC pairs (WXC 204*a*/204*b* and 204*c*/204*d*) of the core portion of the node 300*a*. For example, all four remaining add ports of ROADMs 308*a* and 308*b* (two add ports each) may be coupled with the drop ports of WXC 204*b* and WXC 204*c*. In such an embodiment, interconnection between the core network 292 and either of the access networks 292*a* and 292*b* may be supported at an individual wavelength granularity. In various embodiments, the WXC units 202 and ROADMs 308 may be colorless.

In such an embodiment, communication between the access networks 292*a* and 292*b* and the core network 290 may be omni-directional in that any optical signal arriving via a first portion of an access network may depart the node 300*c* via either portion of the core network 290, via WXC 204*a* or 204*d*, as desired. Likewise, for an optical signal arriving via the core network 290. In various embodiments, the interconnect node 200a may provide up to 18 degrees that may be terminated in the node 200a.

No direct cross-access network 292a and 292b traffic may be allowed. In such an embodiment, the access networks 292a and 292b may be physically separated and partitioned from one another. However, core-access network traffic may be possible. In this embodiment, an internal access network traffic or transmission path may be possible as the ROADMs are placed in series.

Figure 3B:
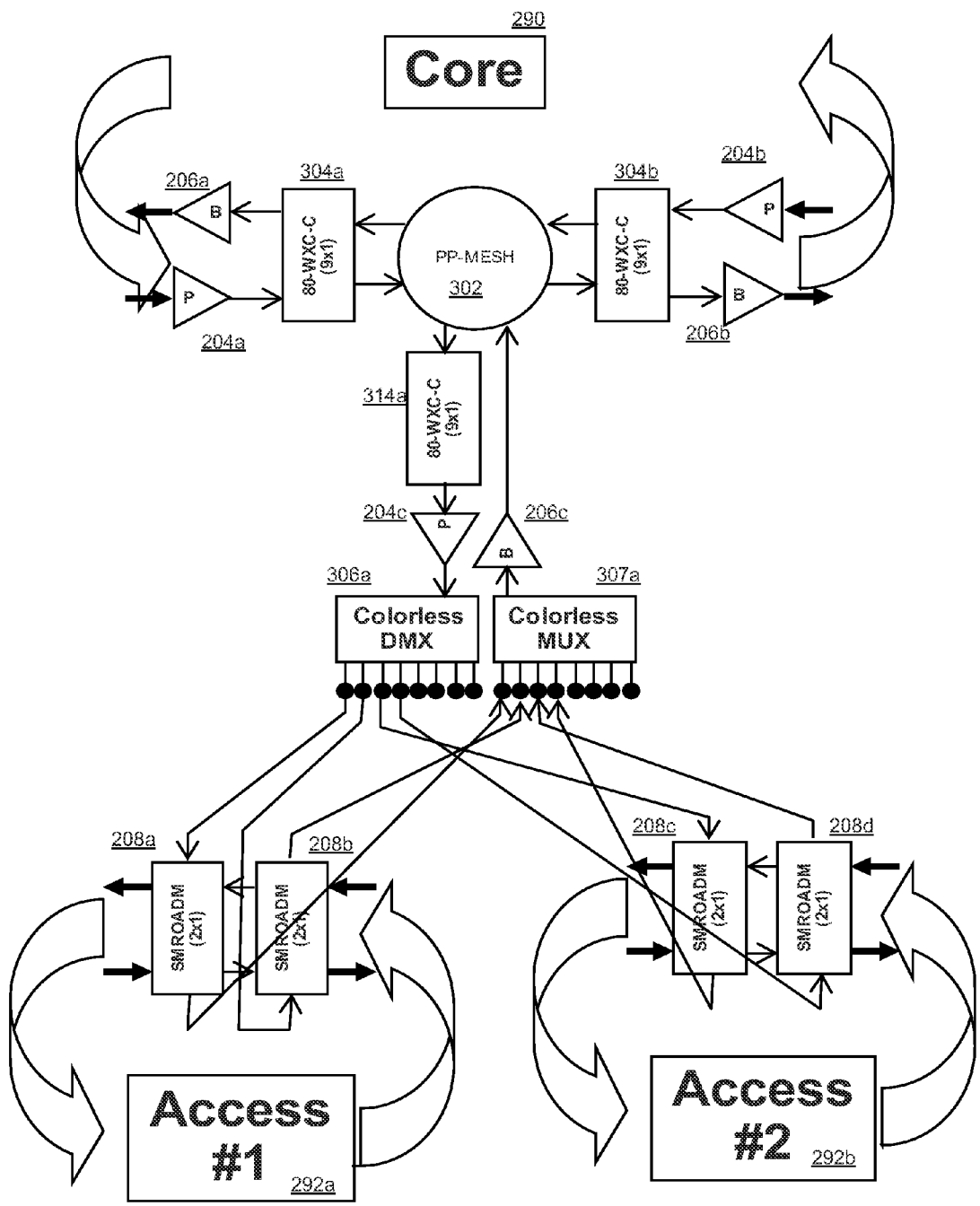

FIG. 3b illustrates a second embodiment of a system or interconnection node 300b that is configured to provide omni-directional Access-Core interconnection capabilities while providing no Access-to-Access interconnection capabilities. The interconnection node 300b may be coupled with a core optical network 290, and a first access optical network 292a, and a second optical network 292b.

In such an embodiment, the core network portion may differ from that of node 200a. In one embodiment, the core network portion of node 300b may include a patch-panel mesh (PP-Mesh) 302 configured to interconnect the add/drop ports of two WXC units 304a, 304b (collectively WXC units 304), and the transmission path of a third WXC unit 314a. The WXC unit 304a may be coupled to a first portion of the core network 290 (via pre-in amplifier 204a and booster amplifier 206a), and to the PP-Mesh 302 via its add/drop ports. Likewise, WXC unit 304b may be coupled to a second portion of the core network 290 (via pre-in amplifier 204b and booster amplifier 206b), and to the PP-Mesh 302 via its add/drop ports.

The WXC unit 314a may be coupled via its transmission path port to PP-Mesh 302 and, also via its transmission path port to a colorless demultiplexer (DMX) 306a (via pre-in amplifier 204c). The core network portion of node 300b may include a colorless multiplexer (MUX) 307a coupled with the PP-Mesh 302 via a booster amplifier 206c. In the illustrated embodiment, the MUX 307a and DMX 306a may respectively provide 8 add/drop ports; although, it is understood that the above is merely one illustrative example to which the disclosed subject matter is not limited.

In this embodiment, the access portions (ROADMs 208a, 208b, 208c, and 208d, collectively ROADMs 208) may be configured similarly to that of node 200a. However, instead of their respective add/drop ports being connected to the WXC units 304 of the core network portion of the node 300a, the ROADMs' 208 add/drop ports may be coupled with the add/drop ports of the MUX 307a and DMX 306a, respectively.

In such an embodiment, interconnection between the core network 292 and either of the access networks 292a and 292b may be supported at an individual wavelength granularity. In various embodiments, the WXC units 304 and 314a and ROADMs 208 may be colorless.

In such an embodiment, communication between the access networks 292a and 292b and the core network 290 may be omni-directional in that any optical signal arriving via a first portion of an access network may depart the node 300c via either portion of the core network 290, via WXC 204a or 204d, as desired. Likewise, for an optical signal arriving via the core network 290. In various embodiments, the interconnect node 200a may provide up to 15 degrees that may be terminated in the node 200a. In addition, the ROADMs may be configured to allow an open or free add/drop port per pair that may be available for further connection to an user of the node 300b see fit (e.g., to an electrical convertor, etc.).

No direct cross-access network 292a and 292b traffic may be allowed. In such an embodiment, the access networks 292a and 292b may be physically separated and partitioned from one another. However, core-access network traffic may be possible in an omni-directional fashion via the PP-Mesh 302. In this embodiment, an internal access network traffic or transmission path may be possible as the ROADMs are placed in series.

Figure 3C:
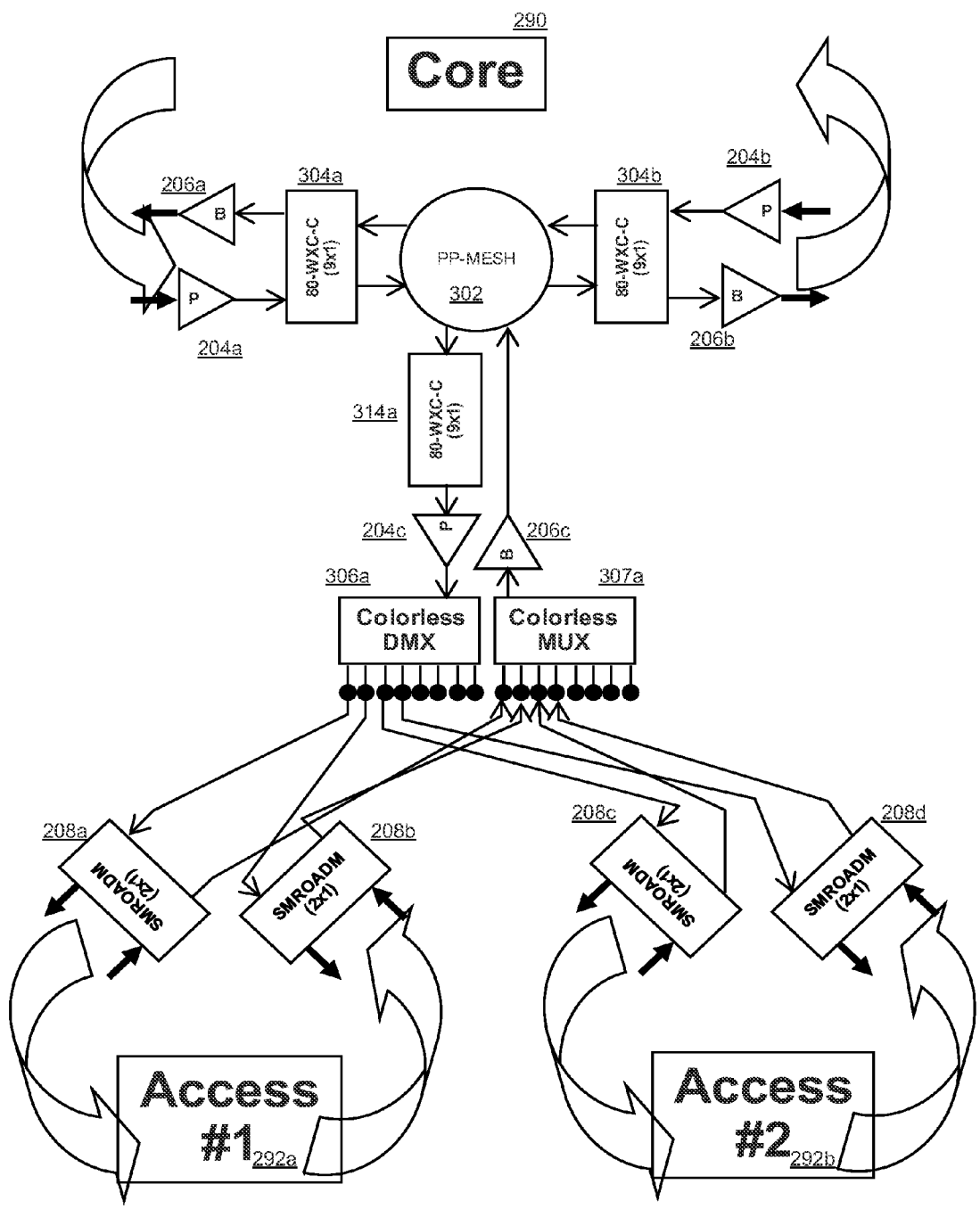

FIG. 3c illustrates a third embodiment of a system or interconnection node 300c that is configured to provide omni-directional Access-Core interconnection capabilities while providing no Access-to-Access interconnection capabilities. The interconnection node 300c may be coupled with a core optical network 290, and a first access optical network 292a, and a second optical network 292b.

In such an embodiment, the core network portion may be similar to that of node 300b. The core network portion may include a PP-Mesh 302, three WXC units 304 and 314a, three pre-in amplifiers 204 three booster amplifiers 206, a colorless DMX 307a and a colorless MUX 307a.

In this embodiment, the access portions (ROADMs 208a, 208b, 208c, and 208d, collectively ROADMs 208) may be configured similarly to that of node 200b. However, instead of their respective add/drop ports being connected to the WXC units 304 and 314a of the core network portion of the node 300a, the ROADMs' 208 add/drop ports may be coupled with the add/drop ports of the MUX 307a and DMX 306a, respectively.

In such an embodiment, interconnection between the core network 292 and either of the access networks 292a and 292b may be supported at an individual wavelength granularity. In various embodiments, the WXC units 304 and 314a and ROADMs 208 may be colorless.

In such an embodiment, communication between the access networks 292a and 292b and the core network 290 may be omni-directional in that any optical signal arriving via a first portion of an access network may depart the node 300c via either portion of the core network 290, via WXC 304a or 304d, as desired. Likewise, for an optical signal arriving via the core network 290. In various embodiments, the interconnect node 200a may provide up to 15 degrees that may be terminated in the node 200a. In addition, the ROADMs may be configured to allow an open or free add/drop port per pair that may be available for further connection to an user of the node 300b see fit (e.g., to an electrical convertor, etc.).

No direct cross-access network 292a and 292b traffic may be allowed. In such an embodiment, the access networks 292a and 292b may be physically separated and partitioned from one another. However, core-access network traffic may be possible in an omni-directional fashion via the PP-Mesh 302. In this embodiment, an internal access network traffic or transmission path may not be possible as the ROADMs are not placed in series.

Figure 3D:
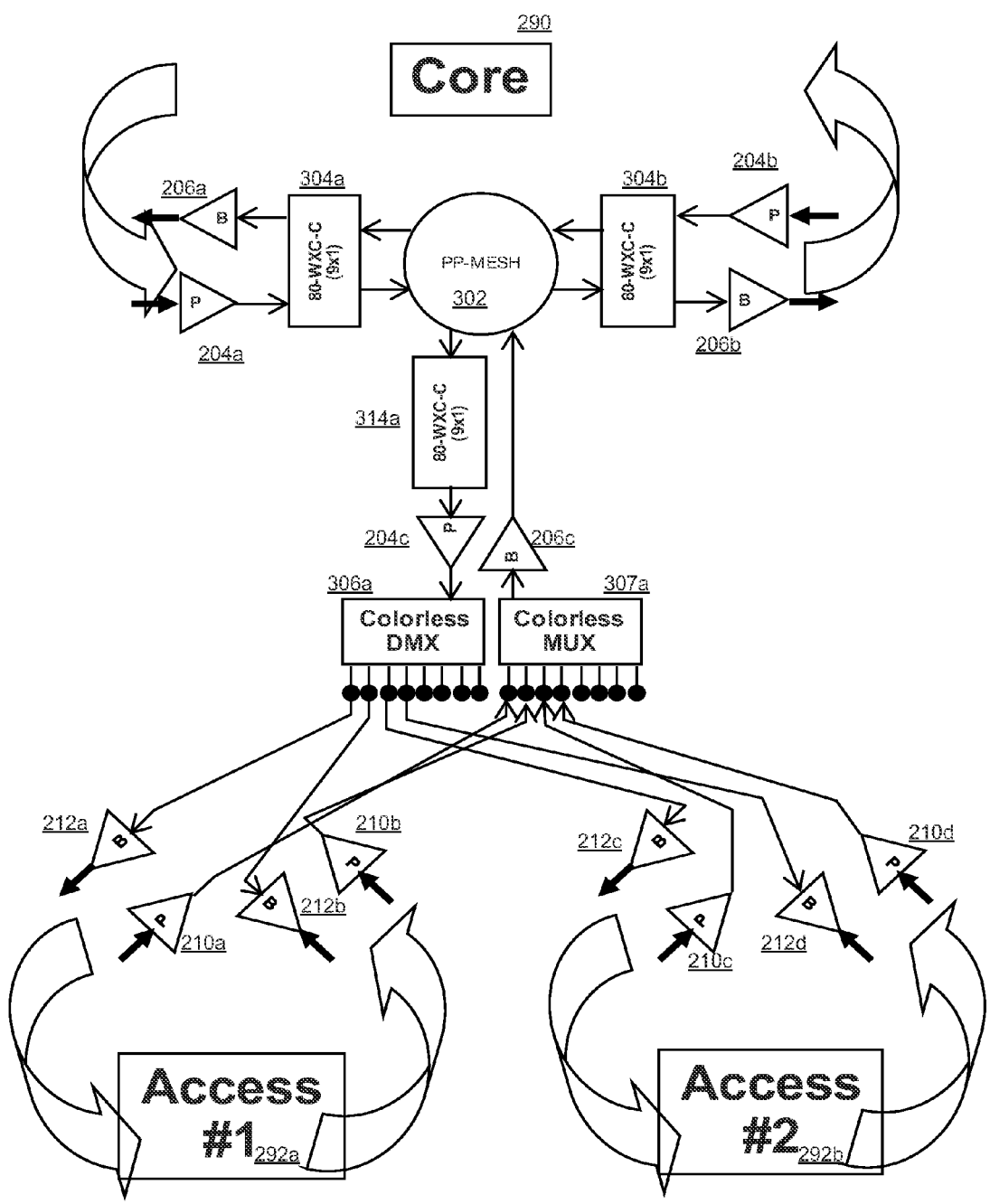

FIG. 3d illustrates a fourth embodiment of a system or interconnection node 300d that is configured to provide omni-directional Access-Core interconnection capabilities while providing no Access-to-Access interconnection capabilities. The interconnection node 300d may be coupled with a core optical network 290, and a first access optical network 292a, and a second optical network 292b.

In such an embodiment, the core network portion may be similar to that of node 300b. The core network portion may include a PP-Mesh 302, three WXC units 304 and 314a, three pre-in amplifiers 204 three booster amplifiers 206, a colorless DMX 307a and a colorless MUX 307a.

In this embodiment, the access portions (pre-in amplifiers 210 and booster amplifiers 212) may be configured similarly to that of node 200c. However, instead of the respective amplifiers 210 or 212 being connected to the WXC units 304 and 314a of the core network portion of the node 300a, the amplifiers 210 or 212 may be coupled with the add/drop ports of the MUX 307a and DMX 306a, respectively.

In such an embodiment, interconnection between the core network 292 and either of the access networks 292a and 292b may be supported at an individual wavelength granularity. In various embodiments, the WXC units 304 and 314a may be colorless.

In such an embodiment, communication between the access networks 292a and 292b and the core network 290 may be omni-directional. In various embodiments, the interconnect node 200a may provide up to 15 degrees that may be terminated in the node 200a.

No direct cross-access network 292a and 292b traffic may be allowed. In such an embodiment, the access networks 292a and 292b may be physically separated and partitioned from one another. However, core-access network traffic may be possible in an omni-directional fashion via the PP-Mesh 302. In this embodiment, an internal access network traffic or transmission path may not be possible.

Figure 4A:
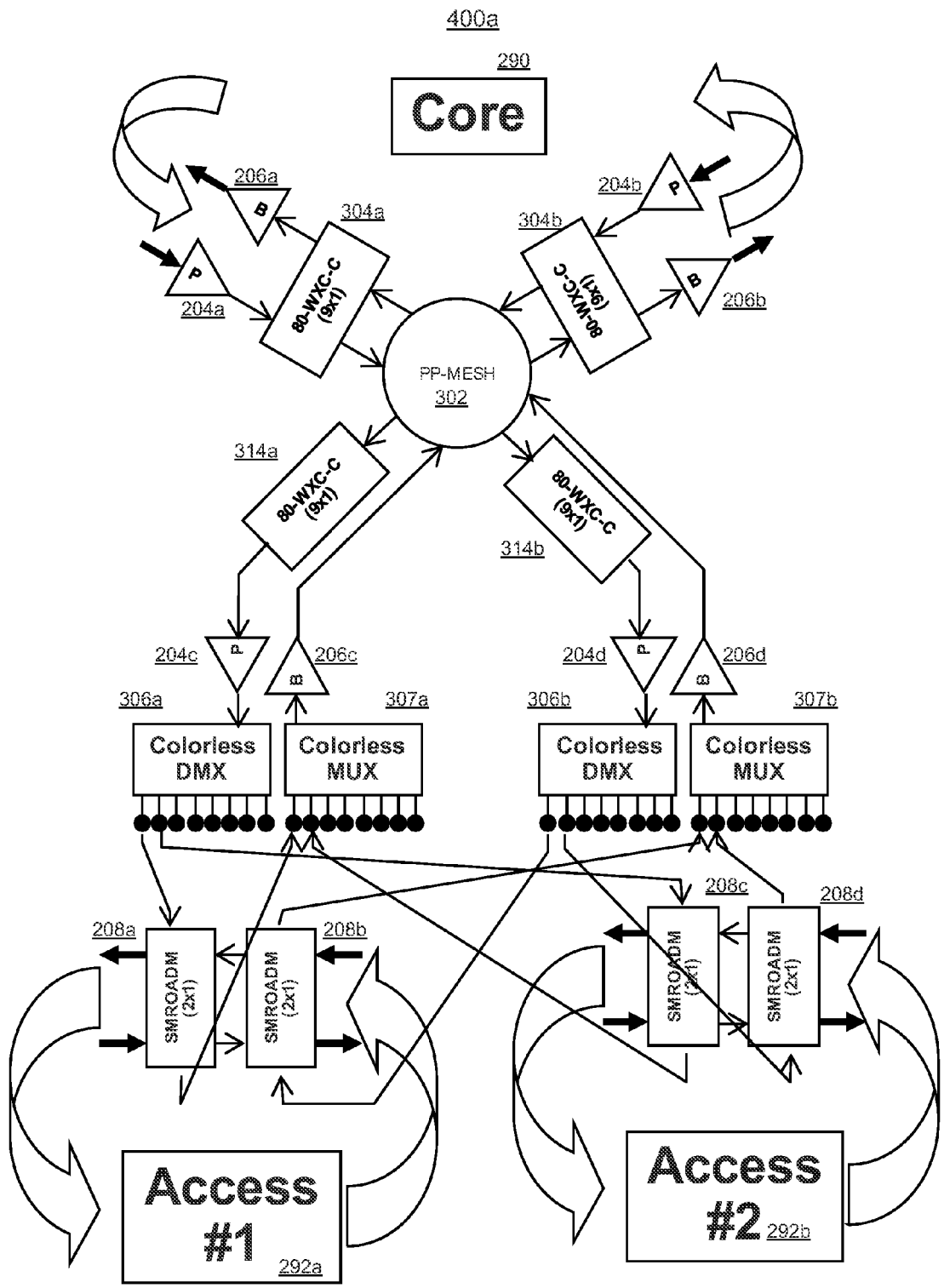
FIG. 4 is a series of block diagrams of example embodiments of systems in accordance with the disclosed subject matter.
Figure 4B:
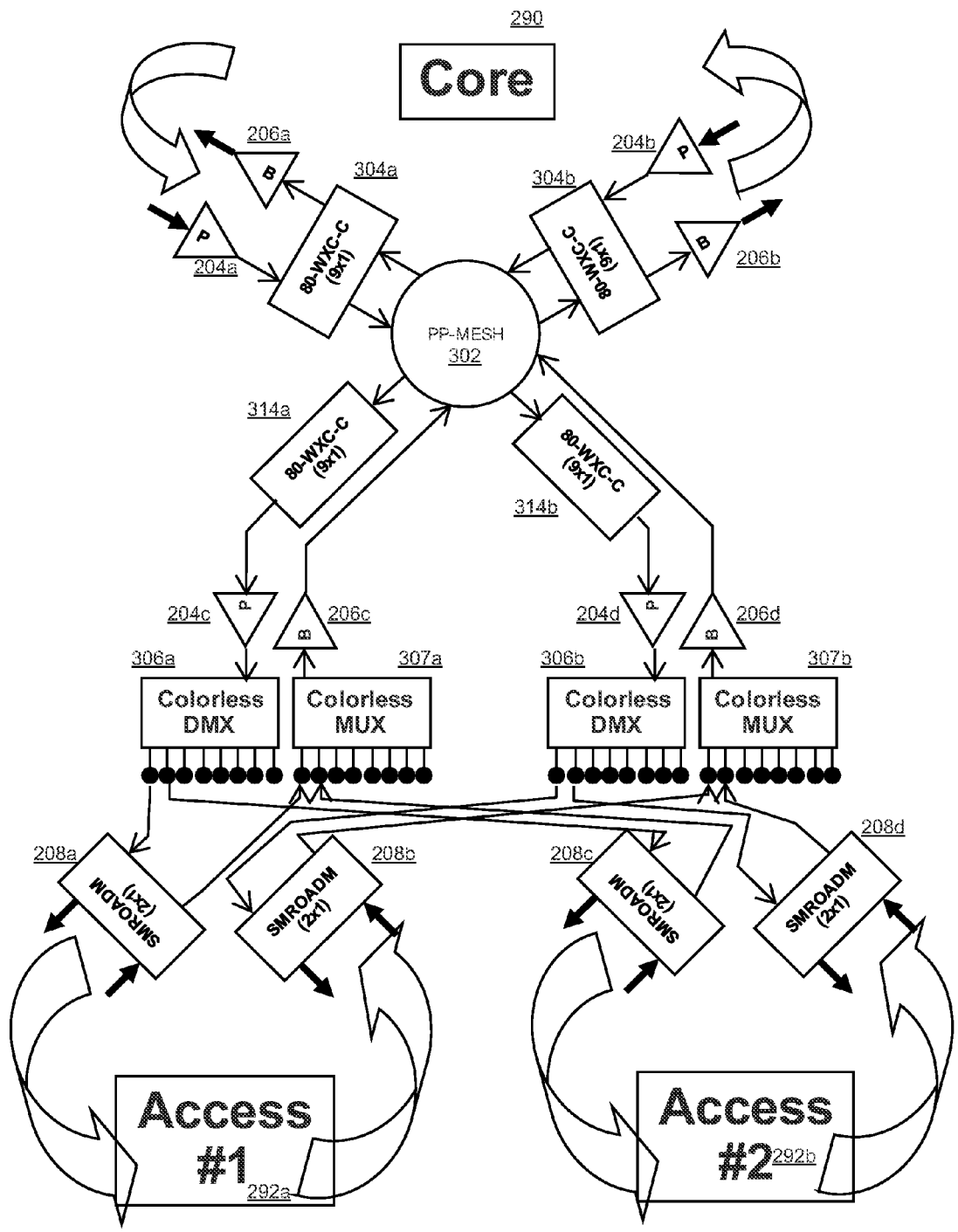
Figure 4C:
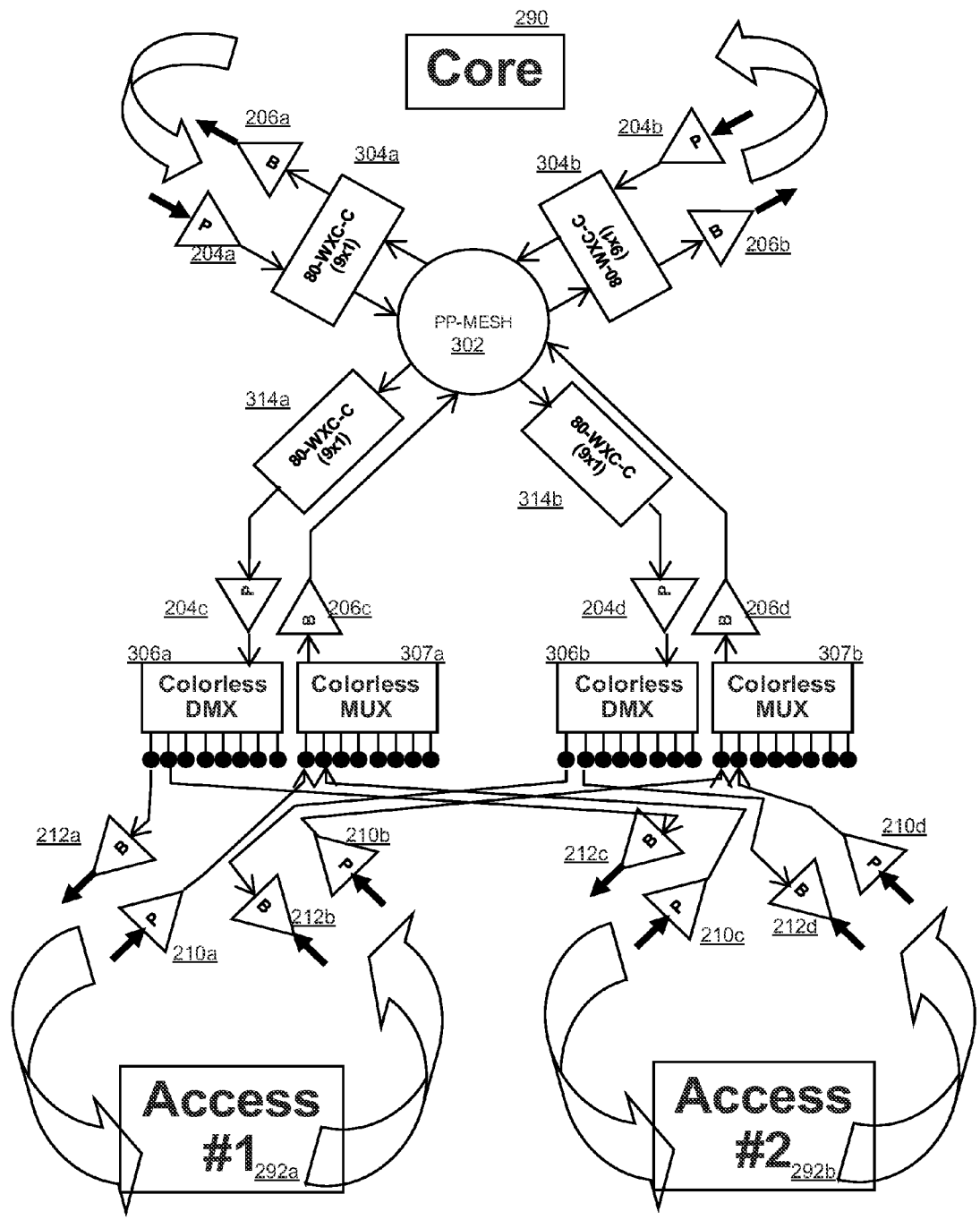

FIG. 4 is a series block diagrams of example embodiments of systems or interconnect nodes in accordance with the disclosed subject matter. Furthermore, it is understood that FIGS. 4a, 4b, and 4c represent a plurality of embodiments grouped together for purposes of illustration and description, herein the multiple pages will simply be referred to as FIG. 4. Specifically, FIG. 4 illustrates and shows embodiments of an interconnect ROADM or node that provides both omni-directional Access-Core interconnection capabilities and omni-directional Access-to-Access interconnection capabilities.

FIG. 4a illustrates a second embodiment of a system or interconnection node 400a that is configured to provide omni-directional Access-Core interconnection capabilities and omni-directional Access-to-Access interconnection capabilities. The interconnection node 400a may be coupled with a core optical network 290, and a first access optical network 292a, and a second optical network 292b.

In such an embodiment, the core network portion may differ from that of node 300b. In one embodiment, the core network portion of node 400a may include a patch-panel mesh (PP-Mesh) 302 configured to interconnect the add/drop ports of two WXC units 304a, 304b (collectively WXC units 304), and the transmission path of a third WXC unit 314a and a fourth WXC unit 314b (collectively WXC units 314).

The WXC unit 304a may be coupled to a first portion of the core network 290 (via pre-in amplifier 204a and booster amplifier 206a), and to the PP-Mesh 302 via its add/drop ports. Likewise, WXC unit 304b may be coupled to a second portion of the core network 290 (via pre-in amplifier 204b and booster amplifier 206b), and to the PP-Mesh 302 via its add/drop ports.

The WXC unit 314a may be coupled via its transmission path port to PP-Mesh 302 and, also via its transmission path port to a colorless demultiplexer (DMX) 306a (via pre-in amplifier 204c). The core network portion of node 400a may include a colorless multiplexer (MUX) 307a coupled with the PP-Mesh 302 via a booster amplifier 206c. Likewise, the WXC unit 314b may be coupled via its transmission path port to PP-Mesh 302 and, also via its transmission path port to a colorless demultiplexer (DMX) 306b (via pre-in amplifier 204d). The core network portion of node 400a may include a colorless multiplexer (MUX) 307b coupled with the PP-Mesh 302 via a booster amplifier 206d. In the illustrated embodiment, the MUXs 307a and 307b (collectively MUXs 307) and DMX 306a and 306b (collectively DMXs 307) may respectively provide 8 add/drop ports; although, it is understood that the above is merely one illustrative example to which the disclosed subject matter is not limited.

In this embodiment, the access portions (ROADMs 208a, 208b, 208c, and 208d, collectively ROADMs 208) may be configured similarly to that of node 200a. However, instead of their respective add/drop ports being connected to the WXC units 304 of the core network portion of the node 300a, the ROADMs' 208 add/drop ports may be coupled with the add/drop ports of the MUXs 307 and DMXs 306, respectively. For example, the add/drop ports of ROADMs 208a and 208c may be coupled with the add/drop ports of the MUX 307a and DMX 306a, respectively. Furthermore, the add/drop ports of ROADMs 208b and 208d may be coupled with the add/drop ports of the MUX 307b and DMX 306b, respectively In such an embodiment, interconnection between the core network 292 and either of the access networks 292a and 292b may be supported at an individual wavelength granularity. In various embodiments, the WXC units 304 and 314a and ROADMs 208 may be colorless. In various embodiments, the interconnect node 400a may provide up to 24 degrees that may be terminated in the node 400a.

Cross-access network 292a and 292b traffic may be allowed in an omni-directional fashion via the PP-Mesh 302. And, core-access network traffic may be possible in an omni-directional fashion via the PP-Mesh 302. In this embodiment, an internal access network traffic or transmission path may be possible as the ROADMs are placed in series.

FIG. 4b illustrates a second embodiment of a system or interconnection node 400b that is configured to provide omni-directional Access-Core interconnection capabilities and omni-directional Access-to-Access interconnection capabilities. The interconnection node 400b may be coupled with a core optical network 290, and a first access optical network 292a, and a second optical network 292b.

In such an embodiment, the core network portion may be similar to that of node 400a. In this embodiment, the access portions (ROADMs 208a, 208b, 208c, and 208d, collectively ROADMs 208) may be configured similarly to that of node 200b. However, instead of their respective add/drop ports being connected to the WXC units 304 of the core network portion of the node 300a, the ROADMs' 208 add/drop ports may be coupled with the add/drop ports of the MUXs 307 and DMXs 306, respectively. For example, the add/drop ports of ROADMs 208a and 208c may be coupled with the add/drop ports of the MUX 307a and DMX 306a, respectively. Furthermore, the add/drop ports of ROADMs 208b and 208d may be coupled with the add/drop ports of the MUX 307b and DMX 306b, respectively In such an embodiment, interconnection between the core network 292 and either of the access networks 292a and 292b may be supported at an individual wavelength granularity. In various embodiments, the WXC units 304 and 314a and ROADMs 208 may be colorless. In various embodiments, the interconnect node 400b may provide up to 24 degrees that may be terminated in the node 400b. In addition, the ROADMs 208 may each have a free add/drop port capable of being coupled to another device (e.g., electrical convertor, etc.).

Cross-access network 292a and 292b traffic may be allowed in an omni-directional fashion via the PP-Mesh 302. And, core-access network traffic may be possible in an omni-directional fashion via the PP-Mesh 302. In this embodiment, an internal access network traffic or transmission path may be not possible as the ROADMs are not placed in series.

FIG. 4c illustrates a third embodiment of a system or interconnection node 400c that is configured to provide omni-directional Access-Core interconnection capabilities and omni-directional Access-to-Access interconnection capabilities. The interconnection node 400c may be coupled with a core optical network 290, and a first access optical network 292a, and a second optical network 292b.

In such an embodiment, the core network portion may be similar to that of node 400a. In this embodiment, the access portions (amplifiers 210 and 212) may be configured similarly to that of node 200c. However, instead of their respective add/drop ports being connected to the WXC units 304 of the core network portion of the node 300a, the amplifiers 210 and 212 may be coupled with the add/drop ports of the MUXs 307 and DMXs 306, respectively. For example, the pre-in amplifiers 210a and 210c, and the booster amplifier 212a and 212c may be coupled with the add/drop ports of the MUX 307a and DMX 306a, respectively. Furthermore, the pre-in amplifiers 210b and 210d, and the booster amplifier 212b and 212d may be coupled with the add/drop ports of the MUX 307b and DMX 306b, respectively In such an embodiment, interconnection between the core network 292 and either of the access networks 292a and 292b may be supported at an individual wavelength granularity. In various embodiments, the WXC units 304 and 314 may be colorless. In various embodiments, the interconnect node 400c may provide up to 24 degrees that may be terminated in the node 400b.

Cross-access network 292a and 292b traffic may be allowed in an omni-directional fashion via the PP-Mesh 302. And, core-access network traffic may be possible in an omni-directional fashion via the PP-Mesh 302. In this embodiment, an internal access network traffic or transmission path may not be possible.

In various embodiments, a technique for routing optical signals between a core network and at least one access network may include traversing or routing an optical signal via a system, node or apparatus as described above in FIGS. 2, 3, and 4. In such an embodiment, one or more configurable devices, for example a 40 or 80 channel 40-Channel Wavelength Cross-Connect (40-WXC or 80-WXC), Wavelength Selective Switch (40-WSS, 80-WSS), Multiplexer (40-MUX, 80-MUX), and Demultiplexer (40-DMX, 80-DMX) Units may be configured to act as one or more of the elements or components of the interconnect nodes of FIG. 2, 3, or 4. In such an embodiment, providing a component of the interconnect node may include provisioning or configuring such a programmable device.

Implementations of the various techniques described herein may be implemented in optical circuitry, digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
an interconnection node configured to dynamically provide interconnection access between a first optical network and at least either a second optical network or a third optical network in a purely optical fashion;
wherein the interconnection node includes:
a first network portion coupled with the first network that includes
a first pair of wavelength cross-connect (WXC) units coupled with a first transmission path of the first network, and providing a plurality of add and drop ports, and
a second pair of wavelength cross-connect (WXC) units coupled with a second transmission path of the first network, and providing a plurality of add and drop ports;
a second network portion including first and second multi-degree reconfigurable add-drop multiplexers (ROADMs) coupled with the second network and the first network portion of the interconnection node such that optical signals may be routed between the second network and the first network; and
a third network portion including first and second multi-degree ROADMs coupled with the third network and the first network portion of the interconnection node such that optical signals may be routed between the third network and the first network.

2. The apparatus of claim 1,
wherein the first and second multi-degree ROADMs of the second and third network portions comprise 2-degree ROADMs; and
wherein, for each of the second and third network portions:
an add port of the first 2-degree ROADM is coupled to a drop port of the first pair of WXC units, and wherein a drop port of the first 2-degree ROADM is coupled to an add port of the second pair of WXC units; and
an add port of the second 2-degree ROADM is coupled to a drop port of the second pair of WXC units, and an add port of the second 2-degree ROADM is coupled to an add port of the first pair of WXC units.

3. The apparatus of claim 2, wherein, for each of the second and third network portions, the first and the second 2-degree ROADMs are directly coupled to each other in series.

4. The apparatus of claim 1, wherein the second network portion and the third network portion each include:
a first input amplifier coupled between the respective second or third network and an add port of the first pair of WXC units;
a second input amplifier coupled between the respective second or third network and an add port of the second pair of WXC units;
a first output amplifier coupled between the respective second or third network and a drop port of the first pair of WXC units; and
a second output amplifier coupled between the respective second or third network and a drop port of the second pair of WXC units.

5. The apparatus of claim 1,
wherein the first and second multi-degree ROADMs of the second and third network portions comprise 4-degree ROADMs,
wherein the add ports of each 4-degree ROADM are coupled to respective drop ports of the first pair and second pair of WXC units, and
wherein the drop ports of each 4-degree ROADM are coupled to respective add ports of the first pair and second pair of WXC units.

6. The apparatus of claim 1, wherein the second and third network portions of the interconnection node are coupled with the first network portion of the interconnection node such that optical signals may be routed between the respective second and third networks and the first network in a directional fashion.

7. The apparatus of claim 1, wherein the WXC units of the first network portion of the interconnection node include a plurality of add and drop ports not coupled to the second or third network portions and a configured to provide optical signal termination.

8. The apparatus of claim 1, wherein the interconnection node is configured to provide at least 18 degrees of termination.

9. An apparatus comprising:
an interconnection node configured to dynamically provide interconnection access between a first optical network and at least either a second optical network or a third optical network in a purely optical fashion;
wherein the interconnection node includes:
a first network portion coupled with the first network that includes an omni-directional and colorless multi-degree routing portion;
a second network portion including first and second multi-degree reconfigurable optical add-drop multiplexers (ROADMs) coupled with the second network and the first network portion of the interconnection node such that optical signals may be routed between the second network and the first network; and
a third network portion including first and second multi-degree ROADMs coupled with the third network and the first network portion of the interconnection node such that optical signals may be routed between the third network and the first network.

10. The apparatus of claim 9, wherein the first network portion includes:
a patch-panel mesh (PP-Mesh) configured to route optical signals from a plurality of inputs ports to a plurality output ports;
a first and a second of wavelength cross-connect (WXC) units, each coupled between the first network and the PP-Mesh;
a third WXC unit coupled between the PP-Mesh and a colorless demultiplexer;
the colorless demultiplexer coupled between the third WXC unit and the second and third networks; and
a colorless multiplexer coupled between the PP-Mesh and the second and third networks.

11. The apparatus of claim 10,
wherein the first and second multi-degree ROADMs of the second and third network portions comprise 2-degree ROADMs; and
wherein an add port of each 2-degree ROADM is coupled to the colorless demultiplexer, and wherein a drop port of each 2-degree ROADM is coupled to the colorless multiplexer.

12. The apparatus of claim 11, wherein, for each of the second and third network portions, the first and the second 2-degree ROADMs are directly coupled to each other in series.

13. The apparatus of claim 10, wherein the second network portion and the third network portion each include:
a first and a second input amplifiers coupled between the respective second or third network and the colorless multiplexer; and
a first and a second output amplifier coupled between the respective second or third network and the colorless demultiplexer.

14. The apparatus of claim 9, wherein the second and third network portions of the interconnection node are coupled with the first network portion of the interconnection node such that:
optical signals may be routed between the respective second and third networks and the first network in an omni-directional fashion; and
optical signals may not be directly routed between the second and third networks.

15. The apparatus of claim 9, wherein the first network portion includes:
a patch-panel mesh (PP-Mesh) configured to route optical signals from a plurality of inputs ports to a plurality output ports;
a first and a second of wavelength cross-connect (WXC) units, each coupled between the first network and the PP-Mesh;
a third and a fourth WXC units coupled between the PP-Mesh and a first and a second colorless demultiplexer, respectively;
the first and second colorless demultiplexers coupled between the third and fourth WXC units, respectively, and the second and third networks; and a first and a second colorless multiplexer each coupled between the PP-Mesh and the second and third networks.

16. The apparatus of claim 15,
wherein the first and second multi-degree ROADMs of the second and third network portions comprise 2-degree ROADMs; and
wherein, for each of the second and third network portions:
an add port of the first 2-degree ROADM is coupled to the second colorless demultiplexer, and wherein a drop port of the first 2-degree ROADM is coupled to first colorless multiplexer; and
an add port of the second 2-degree ROADM is coupled to the first colorless demultiplexer, and a drop port of the second 2-degree ROADM is coupled to second colorless multiplexer.

17. The apparatus of claim 16, wherein, for each of the second and third network portions, the first and the second 2-degree ROADMs are directly coupled to each other in series.

18. The apparatus of claim 15, wherein the second network portion and the third network portion each include:
a first input amplifier coupled between the respective second or third network and the second colorless multiplexer;
a second input amplifier coupled between the respective second or third network and the first colorless multiplexer;
a first output amplifier coupled between the respective second or third network and the second colorless demultiplexer; and
a second output amplifier coupled between the respective second or third network and the first colorless demultiplexer.

19. A method comprising:
routing, in a purely optical fashion, an optical signal through an interconnection node configured to dynamically provide interconnection access between a first optical network and at least either a second optical network or a third optical network;
wherein routing the optical signal through the interconnection node includes:
receiving the optical signal via a first network portion of the interconnection node that is coupled with the first network and includes an omni-directional and colorless multi-degree routing portion;
outputting the optical signal to either the second or third optical network via either:
a second network portion including first and second multi-degree reconfigurable optical add-drop multiplexers (ROADMs) coupled with the second network and the first network portion of the interconnection node, or
a third network portion including first and second multi-degree ROADMs coupled with the third network and the first network portion of the interconnection node.

20. The method of claim 19, wherein the first network portion includes:
a patch-panel mesh (PP-Mesh) configured to route optical signals from a plurality of inputs ports to a plurality output ports;
a first and a second of wavelength cross-connect (WXC) units, each coupled between the first network and the PP-Mesh;
a third and a fourth WXC units coupled between the PP-Mesh and a first and a second colorless demultiplexer, respectively;
the first and second colorless demultiplexers coupled between the third and fourth WXC units, respectively, and the second and third networks; and
a first and a second colorless multiplexer each coupled between the PP-Mesh and the second and third networks.

* * * * *